United States Patent
Stöckel et al.

(10) Patent No.: US 7,879,509 B2
(45) Date of Patent: Feb. 1, 2011

(54) RADIATION-CROSSLINKING AND THERMALLY CROSSLINKING PU SYSTEMS BASED ON ISOCYANATE-REACTIVE BLOCK COPOLYMERS

(75) Inventors: Nicolas Stöckel, Köln (DE); Friedrich-Karl Bruder, Krefeld (DE); Harald Blum, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 293 days.

(21) Appl. No.: 12/100,812

(22) Filed: Apr. 10, 2008

(65) Prior Publication Data

US 2009/0062419 A1 Mar. 5, 2009

Related U.S. Application Data

(60) Provisional application No. 60/922,883, filed on Apr. 11, 2007.

(51) Int. Cl.
*G03G 7/00* (2006.01)
*C08G 18/00* (2006.01)
*C08L 67/00* (2006.01)
*C08L 71/00* (2006.01)

(52) U.S. Cl. .................. 430/2; 522/141; 522/142; 522/143; 522/145; 522/146; 522/174; 525/92 C; 525/903

(58) Field of Classification Search ............... 522/174, 522/90, 141, 142, 143, 145, 146; 528/65; 525/92 C, 903

See application file for complete search history.

(56) References Cited

U.S. PATENT DOCUMENTS

| | | | | |
|---|---|---|---|---|
| 3,896,303 | A | * | 7/1975 | Gerkin et al. ............... 528/361 |
| 4,202,957 | A | * | 5/1980 | Bonk et al. .................. 528/77 |
| 4,224,399 | A | * | 9/1980 | Merrill et al. ............ 430/282.1 |
| 4,247,578 | A | | 1/1981 | Skinner et al. |
| 5,034,306 | A | * | 7/1991 | Gersdorf et al. .......... 430/284.1 |
| 5,716,757 | A | * | 2/1998 | Sakata et al. ............. 430/284.1 |
| 5,843,622 | A | * | 12/1998 | Tomita et al. ............ 430/284.1 |
| 6,333,077 | B1 | | 12/2001 | Maag et al. |
| 6,743,552 | B2 | | 6/2004 | Setthachayanon et al. |
| 2005/0165163 | A1 | | 7/2005 | Krebs et al. |

FOREIGN PATENT DOCUMENTS

DE 197 09 560 5/1998
EP 0 934960 A1 8/1999

* cited by examiner

*Primary Examiner*—Susan W Berman
(74) *Attorney, Agent, or Firm*—Connolly Bove Lodge & Hutz LLP

(57) ABSTRACT

The present invention provides polyurethane systems which cure by radiation and thermal action with crosslinking, and use thereof for the production of holographic media. The polyurethane compositions of the invention comprise A) polyisocyanates, B) isocyanate-reactive block copolymers, C) compounds having groups which react on exposure to actinic radiation with ethylenically unsaturated compounds with polymerization, D) optionally free radical stabilizers and E) photoinitiators.

20 Claims, No Drawings

RADIATION-CROSSLINKING AND THERMALLY CROSSLINKING PU SYSTEMS BASED ON ISOCYANATE-REACTIVE BLOCK COPOLYMERS

CROSS-REFERENCE TO RELATED APPLICATION

This application claims priority under 35 U.S.C. §119(e) to provisional application Ser. No. 60/922,883, filed Apr. 11, 2007, the disclosure of which is incorprorated by reference for all useful purposes.

FIELD OF THE INVENTION

The present invention relates to polyurethane systems which cure by radiation and thermal action with crosslinking, and the use thereof for the production of holographic media.

BACKGROUND OF THE INVENTION

In the production of holographic media, as described in U.S. Pat. No. 6,743,552, information is stored in a polymer layer which substantially consists of a matrix polymer and very special polymerizable monomers distributed uniformly therein. This matrix polymer may be based on polyurethane. It is prepared as a rule starting from NCO-functional prepolymers which are crosslinked with polyols, such as polyethers or polyesters, with urethane formation.

However, what is problematic is that optical impairment, such as opacity phenomena of the storage layer, frequently occurs owing to the incompatibilities between such urethane matrices and radiation-curing monomers.

Systems comprising polyisocyanates, polyols and radiation-curing compounds, such as photochemically crosslinking reactive diluents, are known in individual cases from the area of coating technology (U.S. Pat. No. 4,247,578, DE 197 09 560). Polyol components mentioned are substantially polyether- or polyester-based ones or polyacrylatepolyols. Nothing specific is stated regarding their compatibilities with the olefinically unsaturated compounds likewise present, such as acrylate-based reactive diluents.

SUMMARY OF THE INVENTION

It was an object of the present invention to provide polyurethane systems which are suitable for the production of storage layers for holographic storage media and which have optically satisfactory compatibility of polyurethane matrix polymer with the olefinically unsaturated radiation-curing monomers present therein.

It has now been found that excellent compatibility of matrix polymer with the unsaturated monomers is obtained precisely when isocyanate-reactive block copolymers are used as a building block for the matrix polymers.

The invention relates to polyurethane systems comprising
A) polyisocyanates,
B) isocyanate-reactive block copolymers,
C) compounds having groups which react on exposure to actinic radiation with ethylenically unsaturated compounds with polymerization (radiation-curing groups),
D) optionally free radical stabilizers and
E) photoinitiators.

DETAILED DESCRIPTION OF THE INVENTION

As used herein in the specification and claims, including as used in the examples and unless otherwise expressly speci-fied, all numbers may be read as if prefaced by the word "about", even if the term does not expressly appear. Also, any numerical range recited herein is intended to include all subranges subsumed therein.

In the context of the present invention, block copolymers are understood as meaning polymeric compounds which consist of two or more blocks having in each case polymer chains which are uniform with respect to monomers and are chemically bonded to one another, preferably linearly.

Polyisocyanates of component A) which may be used are all compounds well known per se to the person skilled in the art or mixtures thereof, which on average have two or more NCO functions per molecule. These may have an aromatic, araliphatic, aliphatic or cycloaliphatic basis. Monoisocyanates and/or polyisocyanates containing unsaturated groups may also be concomitantly used in minor amounts.

For example, butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)-methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-toluene diisocyanate, 1,5-naphthylene diisocyanate, 2,4'- or 4,4'-diphenylmethane diisocyanate and/or triphenylmethane 4,4',4"-triisocyanate are suitable.

The use of derivatives of monomeric di- or triisocyanates having urethane, urea, carbodiimides, acylurea, isocyanurate, allophanate, biuret, oxadiazinetrione, uretdione and/or iminooxadiazinedione structures is also possible.

The use of polyisocyanates based on aliphatic and/or cycloaliphatic di- or triisocyanates is preferred.

The polyisocyanates of component A) are particularly preferably dimerized or oligomerized aliphatic and/or cycloaliphatic di- or triisocyanates.

Isocyanurates, uretdiones and/or iminooxadiazinediones based on HDI, 1,8-diisocyanato-4-(isocyanatomethyl)octane or mixtures thereof are very particularly preferred.

The component A) preferably has at least 60% by weight of polyisocyanates based on aliphatic and/or cycloaliphatic di- and/or triisocyanates.

The NCO groups of the polyisocyanates of component A) may also be completely or partly blocked with the blocking agents customary per se in industry. These are, for example, alcohols, lactams, oximes, malonic esters, alkyl acetoacetates, triazoles, phenols, imidazoles, pyrazoles and amines, such as, for example, butanone oxime, diisopropylamine, 1,2,4-triazole, dimethyl-1,2,4-triazole, imidazole, diethyl malonate, ethyl acetoacetate, acetone oxime, 3,5-dimethylpyrazole, epsilon-caprolactam, N-tert-butylbenzylamine, cyclopentanone carboxyethyl ester or any desired mixtures of these blocking agents.

All hydroxyl-functional block copolymers can be used in component B). These may contain, for example, two or more polyester, polyether, polycarbonate, poly(meth)acrylate and/or polyurethane segments arranged blockwise.

Polyester segments may be derived, for example, from linear polyester diols or branched polyester polyols, as obtained in known manner from aliphatic, cycloaliphatic or aromatic di- or polycarboxylic acids or their anhydrides with polyhydric alcohols having an OH functionality of $\geq 2$.

Examples of such di- or polycarboxylic acids or anhydrides are succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid and acid anhydrides, such as o-phthalic, trimellitic or succinic anhydride, or any desired mixtures thereof with one another.

Examples of such suitable alcohols are ethanediol, di-, tri- or tetraethylene glycol, 1,2-propanediol, di-, tri- or tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcyclohexane, 1,8-octanediol, 1,10-decanediol, 1,12-dodecandiol, trimethylolpropane, glycerol or any desired mixtures thereof with one another.

The polyester segments may also be based on natural raw materials, such as caster oil. It is also possible for the polyester segments to be based on homo- or copolymers of lactones, as can preferably be obtained by an addition reaction of lactones or lactone mixtures, such as butyrolactone, ε-caprolactone and/or methyl-ε-caprolactone, with hydroxyl-functional compounds, such as polyhydric alcohols having an OH functionality of $\geq 2$, for example of the abovementioned type, or hydroxyl-functional segments of the polymer.

The polyols on which the polyester segments are based preferably have number average molar masses of from 400 to 4000 g/mol, particularly preferably from 500 to 2000 g/mol. Their OH functionality is preferably from 1.5 to 3.5, particularly preferably from 1.8 to 3.0.

Polycarbonate segments are usually based on polyols, as can be obtained in a manner known per se by reacting organic carbonates or phosgene with diols or diol mixtures.

Suitable organic carbonates are dimethyl, diethyl and diphenyl carbonate.

Suitable diols or diol mixtures comprise the polyhydric alcohols mentioned per se in relation to the polyester segments and having an OH functionality of $\geq 2$, preferably 1,4-butanediol, 1,6-hexanediol and/or 3-methyl-1,5-pentanediol.

The polyols on which the polycarbonate segments are based preferably have number average molar masses of from 400 to 4000 g/mol, particularly preferably from 500 to 2000 g/mol. The OH functionality of these polyols is preferably from 1.8 to 3.2, particularly preferably from 1.9 to 3.0.

Polyether segments are usually based on polyadducts of cyclic ethers with OH- or NH-functional initiator molecules, which polyadducts optionally have a block structure.

Suitable cyclic ethers are, for example, styrene oxides, ethylene oxide, propylene oxide, tetrahydrofuran, butylene oxide, epichlorohydrin and any desired mixtures thereof.

Initiators which may be used are the polyhydric alcohols mentioned per se in relation to the polyester segments and having an OH functionality of $\geq 2$ and primary or secondary amines and aminoalcohols. It is also possible for hydroxyl-functional segments of the polymer to serve as initiators for the polyether block.

The polyols on which the polyether segments are based preferably have number average molar masses of from 250 to 10 000 g/mol, particularly preferably from 500 to 4000 g/mol and very particularly preferably from 600 to 2000 g/mol. The OH functionality is preferably from 1.5 to 4.0, particularly preferably from 1.8 to 3.0.

The block copolymers are usually synthesized starting from a di- or polyhydroxy-functional compound of the type described in relation to the segments, with which the further blocks are subjected to subsequent polyaddition or polycondensation. Depending on the OH functionality and number of subsequent blockwise addition or condensation steps, two-, three-, tetra- or multi-block copolymers are obtained.

The synthesis is preferably effected starting from a polycarbonate-, polyether- or polyester-based dihydroxy-functional compound of the type described above in relation to the segments, with which lactones such as butyrolactone, ε-caprolactone, methyl-ε-caprolactone, γ-phenyl-ε-caprolactone or ε-decanolactone are subjected to a blockwise addition reaction. In this way, linear three- or multi-block copolymers form, for example having the composition poly(lactone)-block-poly(carbonate)-block-poly(lactone) or poly(lactone)-block-poly(ether)-block-poly(lactone) or poly(lactone)-block-poly(ester)-block-poly(lactone) with terminal hydroxyl groups.

Particularly preferably, the basis for the block copolymers of the present invention is a difunctional polyether, with which lactones are subjected to a blockwise addition reaction so that linear poly(lactone)-block-poly(ether)-block-poly(lactone)-polyols with terminal hydroxyl groups result.

The internal polyether segment is preferably based on ethylene oxide, propylene oxide or tetrahydrofuran, particularly preferably on tetrahydrofuran. This preferably has a number average molar mass of from 250 g/mol to 2000 g/mol, preferably from 500 to 1500 g/mol, particularly preferably from 600 to 1100 g/mol.

Preferably, the lactone blocks are based on ε-caprolactone and in each case preferably have a number average molar mass of from 114 g/mol to 1500 g/mol, particularly preferably from 114 g/mol to 1000 g/mol and very particularly preferably from 114 g/mol to 700 g/mol.

Very particularly preferred block copolymers are linear poly(ε-caprolactone)-block-poly(tetrahydrofuran)-block-poly(ε-caprolactone)polyols having terminal hydroxyl groups and a number average molar mass of from 500 g/mol to 5000 g/mol, preferably from 600 g/mol to 4000 g/mol, particularly preferably from 700 g/mol to 3000 g/mol, the average mass fraction of the poly(tetrahydrofuran) block, based on the number average block copolymer, being from 0.2 to 0.9, preferably from 0.4 to 0.8, particularly preferably from 0.5 to 0.7, and the average mass fraction of the two poly(ε-caprolactone) blocks, based on the number average block copolymer, being from 0.1 to 0.8, preferably from 0.2 to 0.5 and particularly preferably from 0.3 to 0.4.

The block copolymers according to the invention are obtained, for example, by subjecting the following block to an addition or condensation reaction with a preferably dihydroxy-functional polyol block in the abovementioned manner. In the case of lactone blocks, suitable lactones are added and a suitable catalyst for polymerization is added. Suitable catalysts are all suitable for esterification, such as, for example, tin octanoate, tin chloride and p-toluenesulfonic acid. Here, the catalyst is used in a concentration of from 50 to 1000 ppm, preferably from 100 to 800 ppm, particularly preferably from 150 to 500 ppm.

The polyaddition is carried out at temperatures of from 90 to 260° C., preferably from 100 to 180° C. Depending on the system, the duration of reaction is from 1 to 15 hours, preferably from 2 to 10 hours. The progress of the reaction is observed at regular intervals by determining the solids content, i.e. the non-volatile fractions, and the polymerization is terminated on reaching a solids content of 95% by weight, preferably 99.5% by weight, by cooling to room temperature.

In addition to the block copolymers essential to the invention and mixtures thereof, further polyols may also be present in the PU systems according to the invention. These are preferably poly(propylene oxides), polyethylene oxide-polypropylene oxides and/or poly(tetrahydrofurans) having an OH functionality of from 2 to 4 and a number average molar mass of from 250 to 5000 g/mol, preferably from 400 to 3000 g/mol and particularly preferably from 500 to 2000 g/mol.

If used, the proportion of the block copolymers is from 1 to 100% by weight, preferably from 20 to 100% by weight, particularly preferably from 60 to 100% by weight, based on the sum of the amounts of component B) and further polyols.

In component C), α,β-unsaturated carboxylic acid derivatives, such as acrylates, meth-acrylates, maleates, fumarates, maleimides, acrylamides and furthermore vinyl ethers, propylene ether, allyl ether and compounds containing dicyclopentadienyl units and olefinically unsaturated compounds, such as styrene, α-methylstyrene, vinyltoluene, vinylcarbazole, olefins, such as, for example, 1-octene and/or 1-decene, vinyl esters, such as, for example, ®VeoVa 9 and/or ®VeoVa 10 from Shell, (meth)acrylonitrile, (meth)acrylamide, methacrylic acid, acrylic acid and any desired mixtures thereof may be used. Acrylates and methacrylates are preferred, and acrylates are particularly preferred.

Esters of acrylic acid or methacrylic acid are generally referred to as acrylates or methacrylates. Examples of acrylates and methacrylates which may be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, trichlorophenyl acrylate, trichlorophenyl methacrylate, tribromophenyl acrylate, tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, 2-naphthyl acrylate, 2-naphthyl methacrylate, 1,4-bis-(2-thionaphthyl)-2-butyl acrylate, 1,4-bis-(2-thionaphthyl)-2-butyl methacrylate, bisphenol A diacrylate, bisphenol A dimethacrylate, tetrabromobisphenol A diacrylate, tetrabromobisphenol A dimethacrylate, 2,2,2-trifluoroethyl acrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl acrylate and/or 2,2,3,3,3-pentafluoropropyl methacrylate.

Epoxy acrylates also suitable as component C) can be obtained as reaction products of bisphenol A diglycidyl ether with hydroxyalkyl (meth)acrylates and carboxylic acids, the bisphenol A diglycidyl ether first being reacted with hydroxyalkyl (meth)acrylate with catalysis by Lewis acid and this hydroxyl-functional reaction product then being esterified with a carboxylic acid by a method known to the person skilled in the alt. Bisphenol A diglycidyl ether itself and brominated variants, such as, for example, tetrabromobisphenol A diglycidyl ether (from Dow Chemical, D.E.R. 542), can advantageously be used as the diepoxide. All hydroxyl-functional acrylates described above can be used as hydroxyalkyl (meth)acrylates, in particular 2-hydroxyethyl acrylate, hydroxypropyl acrylate, 4-hydroxybutyl acrylate, poly(ε-caprolactone) mono (meth)acrylates and poly(ethylene glycol) mono(meth)acrylates. All monofunctional carboxylic acids are in principle suitable as the carboxylic acid, in particular those having aromatic substituents. Propane-2,2-diylbis[(2,6-dibromo-4,1-phenylene)oxy(2-{[3,3,3-tris(4-chlorophenyl)propanoyl]oxy}propane-3,1-diyl)oxyethane-2,1-diyl] diacrylate has proved to be a preferred compound of this class of epoxy acrylates.

Vinylaromatics suitable for component C) are styrene, halogenated derivatives of styrene, such as, for example, 2-chlorostyrene, 3-chlorostyrene, 4-chlorostyrene, 2-bromostyrene, 3-bromostyrene, 4-bromostyrene, p-(chloromethyl)styrene, p-(bromomethyl)styrene or 1-vinylnaphthalene, 2-vinylnaphthalene, 2-vinylanthracene, N-vinylpyrrolidone, 9-vinylanthracene, 9-vinylcarbazole or difunctional compounds, such as divinylbenzene. Vinyl ethers, such as, for example, butyl vinyl ether, are also suitable.

Preferred compounds of component C) are 9-vinylcarbazole, vinylnaphthalene, bisphenol A diacrylate, tetrabromobisphenol A diacrylate, 1,4-bis-(2-thionaphthyl)-2-butyl acrylate, pentabromophenyl acrylate, naphthyl acrylate and propane-2,2-diylbis[(2,6-dibromo-4,1-phenylene)oxy(2-{[3,3,3-tris(4-chlorophenyl)propanoyl]-oxy}propane-3,1-diyl)oxyethane-2,1-diyl]diacrylate.

One or more free radical stabilizers are used as component D). Inhibitors and antioxidants, as described in "Methoden der organischen Chemie [Methods of Organic Chemistry]" (Houben-Weyl), 4th edition, volume XIV/I, page 433 et seq., Georg Thieme Verlag, Stuttgart 1961, are suitable. Suitable classes of substances are, for example, phenols, such as for example, 2,6-di-tert-butyl-4-methylphenol, cresols, hydroquinones, benzyl alcohols, such as benzhydrol, optionally also quinones, such as, for example, 2,5-di-tert-butylquinone, optionally also aromatic amines, such as diisopropylamine or phenothiazine. Preferred free radical stabilizers are 2,6-di-tert-butyl-4-methylphenol, phenothiazine and benzhydrol.

One or more photoinitiators are used as component E). These are usually initiators which can be activated by actinic radiation and initiate a free radical polymerization of the corresponding polymerizable groups. Photoinitiators are commercially sold compounds known per se, a distinction being made between monomolecular (type I) and bimolecular (type II) initiators. (Type I) systems are, for example, aromatic ketone compounds, e.g. benzophenones, in combination with tertiary amines, alkylbenzophenones, 4,4'-bis(dimethylamino)benzophenone (Michler's ketone), anthrone and halogenated benzophenones or mixtures of said types. (Type II) initiators, such as benzoin and its derivatives, benzyl ketals, acylphosphine oxides, e.g. 2,4,6-tri-methylbenzoyldiphenylphosphine oxide, bisacylophosphine oxides, phenylglyoxylic acid esters, camphorquinone, α-aminoalkylphenones, α,α-dialkoxyacetophenones, 1-[4-(phenylthio)phenyl]octane-1,2-dione-2-(O-benzoyloxime) and α-hydroxyalkylphenones, are furthermore suitable. The photoinitiator systems described in EP-A 0223587 and consisting of a mixture of an ammonium arylborate and one or more dyes can also be used as a photoinitiator. For example, tetrabutylammonium triphenylhexylborate, tetrabutylammonium tris-(3-fluorophenyl)hexylborate and tetramethylammonium tris-(3-chloro-4-methylphenyl)hexylborate are suitable as the ammonium arylborate. Suitable dyes are, for example, new methylene blue, thionine, Basic Yellow, pinacyanol chloride, rhodamine 6G, gallocyanine, ethyl violet, Victoria Blue R, Celestine Blue, quinaldine red, crystal violet, brilliant green, Astrazon Orange G, Darrow Red, pyronine Y, Basic Red 29, pyrillium I, cyanine, methylene blue and azure A.

It may also be advantageous to use mixtures of these compounds. Depending on the radiation source used for curing, type and concentration must be adapted to photoinitiator in a manner known to the person skilled in the art. Further details are described, for example, in P. K. T. Oldring (Ed.), Chemistry & Technology of UV & EB Formulations For Coatings, Inks & Paints, vol. 3, 1991, SITA Technology, London, pages 61-328.

Preferred photoinitiators are 2,4,6-trimethylbenzoyldiphenylphosphine oxide, 1-[4-(phenylthio)phenyl]octane-1,2-dione-2-(O-benzoyloxime) and mixtures of tetrabutylammonium tris(3-fluorophenyl)hexylborate, tetramethylammonium tris(3-chloro-4-methylphenyl)hexylborate with dyes, such as, for example, methylene blue, new methylene blue, azure A, pyrillium I, cyanine, gallocyanine, brilliant green, crystal violet and thionine.

Furthermore, one or more catalysts may be used in the PU systems according to the invention. These preferably catalyze the urethane formation. Amines and metal compounds of the metals tin, zinc, iron, bismuth, molybdenum, cobalt, calcium, magnesium and zirconium are preferably suitable for this purpose. Tin octanoate, zinc octanoate, dibutyltin dilaurate, dimethyltin dicarboxylate, iron(III) acetylacetonate, iron(II) chloride, zinc chloride, tetraalkylammonium hydroxides, alkali metal hydroxides, alkali metal alcoholates, alkali metal salts of long-chain fatty acids having 10 to 20 carbon atoms and optionally OH side groups, lead octanoate or tertiary amines, such as triethylamine, tributylamine, dimethylbenzylamine, dicyclohexylmethylamine, dimethylcyclohexylamine, N,N,N',N'-tetramethyldiaminodiethylether, bis(dimethylaminopropyl)urea, N-methyl- or N-ethylmorpholine, N,N'-dimorpholino-diethyl ether (DMDEE), N-cyclohexylmorpholine, N,N,N',N'-tetramethylethylenediamine, N,N,N',N'-tetramethylbutanediamine, N,N,N',N'-tetramethyl-1,6-hexanediamine, pentamethyldiethylenetriamine, dimethylpiperazine, N-dimethylaminoethylpiperidine, 1,2-dimethylimidazole, N-hydroxypropylimidazole, 1-azabicyclo[2.2.0]octane, 1,4-diazabicyclo[2.2.2]octane (Dabco), or alkanolamine compounds such as triethanolamine, triisopropanolamine, N-methyl- and N-ethyldiethanolamine, dimethylaminoethanol, 2-(N,N-dimethylaminoethoxy)ethanol, or N-tris(dialkylaminoalkyl)hexahydrotriazines, e.g. N,N',N'-tris(dimethylaminopropyl)-s-hexahydrotriazine, diazabicyclononane, diazabicycloundecane, 1,1,3,3-tetramethylguanidine, 1,3,4,6,7,8-hexahydro-1-methyl-2H-pyrimido(1,2-a)pyrimidine, are particularly preferred.

Particularly preferred catalysts are dibutyltin dilaurate, dimethyltin dicarboxylate, iron(II) acetylacetonate, 1,4-diazabicyclo[2.2.2]octane, diazabicyclononane, diazabicycloundecane, 1,1,3,3-tetramethylguanidine and 1,3,4,6,7,8-hexahydro-1-methyl-2H-pyrimido(1,2-a)pyrimidine.

In addition, further auxiliaries and additives may also be present in the PU systems according to the invention. These are, for example, solvents, plasticizers, leveling agents, antifoams or adhesion promoters, but also polyurethanes, thermoplastic polymers, oligomers, and further compounds having functional groups, such as, for example acetals, epoxide, oxetanes, oxazolines, dioxolanes and/or hydrophilic groups, such as, for example, salts and/or polyethylene oxides.

Preferably used solvents are readily volatile solvents having good compatibility with the 2-component formulations according to the invention, for example ethyl acetate, butyl acetate or acetone.

Liquids having good dissolution properties, low volatility and a high boiling point are preferably used as plasticizers; these may be, for example, diisobutyl adipate, di-n-butyl adipate, dibutyl phthalate, non-hydroxy-functional polyethers, such as, for example, polyethylene glycol dimethyl ether having a number average molar mass of from 250 g/mol to 2000 g/mol or polypropylene glycol and mixtures of said compounds.

It may also be advantageous simultaneously to use a plurality of additives of one type. Of course, it may also be advantageous to use a plurality of additives of a plurality of types.

The mixture of the components B) to E) and optionally catalysts and auxiliaries and additives usually consists of 24.999-99.899% by weight of component B)

0.1-75% by weight of component C)

0-3% by weight of component D)

0.001-5% by weight of component E)

0-4% by weight of catalysts 0-50% by weight of auxiliaries and additives.

The mixture preferably consists of 86.998-97.998% by weight of component B)

2-13% by weight of component C)

0.001-1% by weight of component D)

0.001-1% by weight of component E)

0-2% by weight of catalysts 0-15% by weight of auxiliaries and additives.

The mixture likewise preferably consists of 44.8-87.8% by weight of component B)

12.5-55% by weight of component C)

0.1-3% by weight of component D)

0.1-3% by weight of component E)

0-3% by weight of catalysts 0-50% by weight of auxiliaries and additives.

The molar ratio of NCO to OH is typically from 0.5 to 2.0, preferably from 0.90 to 1.25.

The PU systems according to the invention are usually obtained by a procedure in which first all components, except for the polyisocyanates A) are mixed with one another. This can be achieved by all methods and apparatuses known per se to the person skilled in the art from mixing technology, such as, for example stirred vessels or both dynamic and static mixers. The temperatures during this procedure are from 0 to 100° C., preferably from 10 to 80° C., particularly preferably from 20 to 60° C. This mixture can immediately be further processed or can be stored as a storage-stable, intermediate, optionally for several months.

If necessary, degassing can also be carried out under a vacuum of, for example, 1 mbar.

The mixing with the polyisocyanate component A) is then effected shortly before the application, it likewise being possible to use the customary mixing techniques. However, apparatuses without any, or with only little dead space are preferred. Furthermore, methods in which the mixing is effected within a very short time and with very vigorous mixing of the two mixed components are preferred. Dynamic mixers, in particular those in which the components A) and B) to E) first come into contact with one another in the mixer are particularly suitable for this purpose. This mixing can be effected at temperatures of from 0 to 80° C., preferably at from 5 to 50° C., particularly preferably from 10 to 40° C. The mixture of the two components A and B can optionally also be degassed after the mixing under a vacuum of, for example, 1 mbar in order to remove the residual gases and to prevent the formation of bubbles in the polymer layer. The mixing gives a clear, liquid formulation which, depending on the composition, cures within a few seconds to a few hours at room temperature.

The PU systems according to the invention are preferably adjusted so that the curing at room temperature begins within minutes to one hour. In a preferred embodiment, the curing is accelerated by heating the formulation after mixing to temperatures between 30 and 180° C., preferably from 40 to 120° C., particularly preferably from 50 to 100° C.

Immediately after mixing of all components, the polyurethane systems according to the invention have viscosities at room temperature of, typically from 10 to 100 000 mPa·s, preferably from 100 to 20 000 mPa·s, particularly preferably from 500 to 10 000 mPa·s, so that they have very good processing properties even in solvent-free form. In a solution with suitable solvents viscosities at room temperature of less than 10 000 mPa·s, preferably less than 2000 mPa·s, particularly preferably less than 500 mPa·s, can be established.

The present invention furthermore relates to the polymers obtainable from PU systems according to the invention.

These preferably have glass transition temperatures of less than −10° C., preferably less than −25° C. and particularly preferably less than −40° C.

According to a preferred process the formulation according to the invention is applied directly after mixing to a substrate it being possible to use all customary methods known to the person skilled in the art in coating technology; in particular, the coating can be applied by knife coating, casting, printing, screen printing, spraying or inkjet printing.

The substrates may be plastic, metal, wood, paper, glass, ceramic and composite materials comprising a plurality of these materials, in a preferred embodiment the substrate having the form of a sheet.

In a preferred embodiment, the coating of the substrate with the formulation is carried out in a continuous process. As a rule the formulation according to the invention is applied as a film having a thickness of from 5 mm to 1 µm, preferably from 500 µm to 5 µm, particularly preferably from 50 µm to 8 µm and very particularly preferably from 25 µm to 10 µm to the substrate.

In the case of a sheet as a substrate, flexible, coated sheets are thus obtained, which sheets, in the case of a continuous process, can be rolled up after curing and thus stored over several months.

In a further preferred embodiment, the formulation is applied so that it is covered on both sides by transparent substrates, in particular plastic or glass, for this purpose the formulation being poured between the substrates held at an exact spacing of from 1 to 2 mm, preferably from 1.2 to 1.8 mm, particularly preferably from 1.4 to 1.6 mm, in particular 1.5 mm, and the substrates being kept at the exact spacing until the formulation has completely solidified and can no longer flow.

The materials used as the substrate can of course have a plurality of layers. It is possible both for the substrate to consist of layers of a plurality of different materials and for it additionally to have, for example, coatings having additional properties, such as improved adhesion, enhanced hydrophobic or hydrophilic properties, improved scratch resistance, antireflection properties in certain wavelength ranges, improved evenness of the surface, etc.

The materials obtained by one of the methods described can then be used for the recording of holograms. For this purpose, two light beams are caused to interfere in the material by a method known to the person skilled in the art of holography (P. Hariharan, Optical Holography 2nd Edition, Cambridge University Press, 1996) so that a hologram forms.

The exposure of the hologram can be effected both by continuous and by pulsed irradiation. It is optionally also possible to produce more than one hologram by exposure in the same material and at the same point, it being possible to use, for example, the angle multiplexing method known to the person skilled in the art of holography. After the exposure of the hologram, the material can optionally also be exposed to a strong, broadband light source and the hologram then used without further necessary processing steps. The hologram can optionally also be further processed by further processing steps, for example transfer to another substrate, deformed, insert-molded, adhesively bonded to another surface, or covered with a scratch-resistant coating.

The holograms produced by one of the processes described can serve for data storage, for the representation of images which serve, for example, for the three-dimensional representation of persons or objects and for the authentification of a person or of an article, for the production of an optical element having the function of a lens, a mirror, a filter, a diffusion screen, a diffraction element, an optical waveguide and/or a mask.

The invention therefore furthermore relates to the use of the PU systems according to the invention in the production of holographic media, and to the holographic media as such.

EXAMPLES

The solids content was determined in each case by the following method:

About 1 g of substance was accurately weighed onto an aluminum dish whose weight was accurately determined beforehand. Drying was then carried out at 140° C. on a drying balance until the sample was found to have a constant mass. Thereafter, the aluminum dish was weighed and the solids content was calculated as the quotient of the mass of the substance after drying divided by the mass of the substance before drying.

Block Copolymer A:

0.10 g of tin octanoate, 64.56 g of ε-caprolactone and 135.34 g of a trifunctional polypropylene oxide polyetherpolyol (equivalent weight 239 g/mol of OH), were initially introduced into a 250 ml flask and heated to 150° C. and kept at this temperature until the solids content (proportion of non-volatile constituents) was 99.5% by weight or higher. Cooling was then effected and the product was obtained as a viscous liquid.

Block Copolymer B:

0.25 g of tin octanoate, 172.29 g of ε-caprolactone and 327.46 g of a difunctional polytetrahydrofuran polyetherpolyol (equivalent weight 325 g/mol of OH), were initially introduced into a 1 l flask and heated to 120° C. and kept at this temperature until the solids content (proportion of non-volatile constituents) was 99.5% by weight or higher. Cooling was then effected and the product was obtained as a viscous liquid.

Block Copolymer C:

0.18 g of tin octanoate, 374.81 g of ε-caprolactone and 374.81 g of a difunctional polytetrahydrofuran polyetherpolyol (equivalent weight 500 g/mol of OH), were initially introduced into a 1 l flask and heated to 120° C. and kept at this temperature until the solids content (proportion of non-volatile constituents) was 99.5% by weight or higher. Cooling was then effected and the product was obtained as a waxy solid.

Block Copolymer D:

0.37 g of tin octanoate, 428.14 g of ε-caprolactone and 321.48 g of a difunctional polyesterpolyol (composed of adipic acid, 1,4-butanediol, 1,6-hexanediol and neopentyl glycol, equivalent weight 214 g/mol of OH) were initially introduced into a 1 l flask and heated to 150° C. and kept at this temperature until the solids content (proportion of non-volatile constituents) was 99.5% by weight or higher. Cooling was then effected and the product was obtained as a viscous liquid.

Block Copolymer E:

0.249 g tin octanoate, 325 g of a di functional polytetrahydrofuran polyetherpolyol (equivalent weight 325 g/mol of OH) and 172.2 g of γ-Butyrolactone were initially introduced into a 1 l three neck flask and heated to 160° C. and stirred at that temperature for app. 60 hours. Remaining γ-Butyrolactone is distilled off at 90° C., 0.1 mbar. The resulting block copolymer is free of monomeric γ-Butyrolactone and has OH# of 162.5.

PU Formulation A:

The isocyanate-reactive component was prepared from 6.159 g of block copolymer A, 0.500 g of benzyl methacrylate, 0.015 g of Darocure TPO (product from Ciba Specialty Chemicals) and 0.050 g of benzhydrol by stirring this mixture at 50° C. until a clear solution was present. The isocyanate component used was a polyisocyanate obtained from hexane diisocyanate with a high uretdione content (Desmodur N3400, commercial product from Bayer MaterialScience AG, NCO content: 21.6%).

PU Formulation B:

The isocyanate-reactive component was prepared from 7.446 g of block copolymer A, 0.493 g of 1,4-bis(thionaphthyl)-2-butyl acrylate, 0.037 g of Irgacure OXE 01 (product from Ciba Specialty Chemicals) and 0.025 g of 2,6-di-tert-butyl-4-methylphenol by stirring this mixture at 50° C. until a clear solution was present. The isocyanate component used was a polyisocyanate obtained from hexane diisocyanate with a high oxadiazinedione content (Desmodur VP LS 2294, experimental product from Bayer MaterialScience AG, NCO content: 23.2%).

PU Formulation C:

The isocyanate-reactive component was prepared from 9.049 g of block copolymer B, 0.660 g of propane-2,2-diylbis [(2,6-dibromo-4,1-phenylene)oxy(2-{[3,3,3-tris(4-chlorophenyl)propanoyl]oxy}propane-3,1-diyl)oxyethane-2,1-diyl]diacrylate, 0.026 g of Darocure TPO (product from Ciba Specialty Chemicals), 0.079 g of benzhydrol and 0.396 g of dibutyl phthalate by stirring this mixture at 50° C. until a clear solution was present. The isocyanate component used was a polyisocyanate obtained from hexane diisocyanate with a high oxadiazinedione content (Desmodur XP 2410, experimental product from Bayer MaterialScience AG, NCO content: 23.5%).

PU Formulation D:

The isocyanate-reactive component was prepared from 8.015 g of block copolymer C, 0.800 g of propane-2,2-diylbis [(2,6-dibromo-4,1-phenylene)oxy(2-{[3,3,3-tris(4-chlorophenyl)propanoyl]oxy}propane-3,1-diyl)oxyethane-2,1-diyl]diacrylate, 0.015 g of Darocure TPO (product from Ciba Specialty Chemicals) and 0.050 g of benzhydrol by stirring this mixture at 50° C. until a clear solution was present. The isocyanate component used was a polyisocyanate obtained from hexane diisocyanate with a high oxadiazinedione content (Desmodur XP 2410, experimental product from Bayer MaterialScience AG, NCO content: 23.5%).

PU Formulation E:

The isocyanate-reactive component was prepared from 6.650 g of block copolymer D, 0.800 g of propane-2,2-diylbis [(2,6-dibromo-4,1-phenylene)oxy(2-{[3,3,3-tris(4-chlorophenyl)propanoyl]oxy}propane-3,1-diyl)oxyethane-2,1-diyl]diacrylate, 0.015 g of Darocure TPO (product from Ciba Specialty Chemicals) and 0.050 g of benzhydrol by stirring this mixture at 50° C. until a clear solution was present. The isocyanate component used was a polyisocyanate obtained from hexane diisocyanate with a high oxadiazinedione content (Desmodur XP 2410, experimental product from Bayer MaterialScience AG, NCO content: 23.5%).

PU Formulation F:

The isocyanate reactive component was prepared from 6.201 g of block Copolymer E, 0.500 g of Propane-2,2-diylbis[(2,6-dibromo-4,1-phenylene)oxy(2-{[3,3,3-tris(4-chlorophenyl)propanoyl]oxy}propane-3,1-diyl)oxyethane-2,1-diyl]-diacrylate, 0.020 g Darocure TPO (product from Ciba Specialty Chemicals) and 0.060 g benzhydrol by stirring the mixture at 60 C. Then 0.300 g dibutylphthalate are added. The isocyanate component used was a polyisocyanate obtained from hexane diisocyanate with a high oxadiazinedione content (Desmodur XP 2410, experimental product from Bayer MaterialScience AG, NCO content: 23.5%)

Comparative Example

PU Formulation G

The isocyanate-reactive component was prepared from 13.955 g of linear difunctional poly(tetrahydrofuran) (Terathane 650, product of Invista, 325 g/mol of OH), 0.929 g of 1,4-bis(thionaphthyl)-2-butyl acrylate, 0.070 g of Irgacure OXE 01 (product from Ciba Specialty Chemicals) and 0.046 g of 2,6-di-tert-butyl-4-methylphenol by stirring this mixture at 50° C. until a clear solution was present. The isocyanate component used was a polyisocyanate obtained from hexane diisocyanate with a high oxadiazinedione content (Desmodur XP 2410, experimental product from Bayer MaterialScience AG, NCO content: 23.5%).

Test specimens were produced from the PU formulations stated in the table by mixing the isocyanate component and the isocyanate-reactive component in the stated ratio with addition of the stated amount of dimethyltin dicarboxylate (Fomrez UL 28, product of GE Silicones) as a urethanization catalyst.

| PU system | Isocyanate | Isocyanate-reactive component | Urethanization catalyst |
| --- | --- | --- | --- |
| A | 3.276 g | 6.734 g | 0.004 g |
| B | 3.504 g | 6.493 g | 0.003 g |
| C | 2.988 g | 10.212 g | 0.005 g |
| D | 1.294 g | 8.705 g | 0.004 g |
| E | 2.484 g | 7.515 g | 0.004 g |
| F | 7.081 g | 2.918 g | 0.004 g |
| G | 5.305 g | 9.691 g | 0.005 g |

The respective formulations were then applied to a glass plate and covered with a second glass plate with spacers holding the two glass plates a suitable distance apart (e.g. 250 μm) and the mixture completely wetting the two inner surfaces of the glass plates. For curing, the samples thus prepared were first stored for 30 minutes at room temperature and then cured for two hours at 50° C. or 60° C. The optical clarity was assessed at the beginning of the room temperature curing, after the end of the 30 minute room temperature curing and after the end of the 2 hour 50 degree forced curing. The assessment was based on the following scheme:

1=transparent

2=slightly turbid

3=completely opaque

The following values were obtained for the example formulations described:

| PU formulation | Beginning | After RT curing for 30 min | After forced curing for 2 h |
|---|---|---|---|
| A | 2 | 2 | 1 |
| B | 2 | 2 | 1 |
| C | 2 | 1 | 1 |
| D | 2 | 1 | 1 |
| E | 2 | 2 | 1 |
| F | 1 | 1 | 1 |
| G | 3 | 3 | 1 |

For further testing of the optical properties, test specimens of the formulations A, B, E and F were then exposed at points by causing two laser beams ($\lambda$=405 nm) to interfere in the test specimen. The appearance of the sample was then rated according to the following classification:

1=Exposed region is detectable with the naked eye only with very great difficulty after a certain observation time.

2=Exposed region can easily be seen immediately with the naked eye.

3=Exposed region shows a strong turbid halo.

| Formulation | Rating of the exposed region |
|---|---|
| A | 1 |
| B | 1 |
| E | 1 |
| F | 1 |
| G | 2 to 3 |

It was thus found that the 2-component formulations A to F according to the invention have a substantially higher transparency than comparative example F in all criteria assessed.

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

What is claimed:

1. A polyurethane system comprising
   A) one or more oligomers of aliphatic and/or cycloaliphatic di- or triisocyanates,
   B) one or more isocyanate-reactive block copolymers,
   C) one or more compounds selected from the group consisting of $\alpha,\beta$-unsaturated carboxylic acid derivatives, vinyl ethers, propylene ether, allyl ether, compounds containing cyclopentadienyl units, olefinically unsaturated compounds, epoxy acrylates and vinyl aromatics,
   D) optionally one or more free radical stabilizers, and
   E) one or more photoinitiators.

2. The polyurethane system of claim 1, wherein said one or more isocyanate-reactive block copolymers comprise polyester, polyether, polycarbonate, poly(meth)acrylate, and/or polyurethane segments arranged blockwise.

3. The polyurethane system of claim 1, wherein said one or more isocyanate-reactive block copolymers are based on polycarbonate-, polyether- or polyester-based dihydroxyfunctional compounds as the internal block, the hydroxyl groups of which are subjected to a blockwise addition reaction with lactones to give three- or multi-block copolymers.

4. The polyurethane system of claim 3, wherein said dihydroxyfunctional compounds are based on polyether diols which are based on ethylene oxide, propylene oxide, and/or tetrahydrofuran.

5. The polyurethane system of claim 3, wherein said lactones are selected from the group consisting of butyrolactone, $\epsilon$-caprolactone, methyl-$\epsilon$-caprolactone, $\gamma$-phenyl-$\epsilon$-caprolactone, $\epsilon$-decanolactone, and mixtures thereof.

6. The polyurethane system of claim 3, wherein said one or more isocyanate-reactive block copolymers are based on polyether-based dihydroxyfunctional compounds as the internal block, wherein said internal polyether block has a number average molar mass in the range of from 250 g/mol to 2000 g/mol.

7. The polyurethane system of claim 3, wherein the lactone blocks are based on $\epsilon$-caprolactone and each have a number average molar mass in the range of from 114 g/mol to 700 g/mol.

8. The polyurethane system of claim 1, wherein said one or more isocyanate-reactive block copolymers comprise linear poly ($\epsilon$-caprolactone)-block-poly(tetrahydrofuran)-block-poly($\epsilon$-caprolactone)polyols having terminal hydroxyl groups and a number average molar mass of from 500 g/mol to 5000 g/mol, wherein the average mass fraction of the poly(tetrahydrofuran) block, based on the number average block copolymer, is in the range of from 0.2 to 0.9 and the average mass fraction of the two poly($\epsilon$-caprolactone) blocks, based on the number average block copolymer, is in the range of from 0.1 to 0.8.

9. The polyurethane system of claim 1, wherein the molar ratio of the NCO to the OH groups of the components of said system is in the range of from 0.90 to 1.25.

10. The polyurethane system of claim 1, wherein said one or more compounds of component C) are selected from the group consisting of 9-vinylcarbazole, vinylnaphthalene, bisphenol A diacrylate, tetrabromobisphenol A diacrylate, 1,4-bis(2-thionaphthyl)-2-butyl acrylate, pentabromophenyl acrylate, naphthyl acrylate, and propane-2,2-diylbis[(2,6-dibromo-4,1-phenylene)oxy(2-{[3,3,3-tris(4-chlorophenyl) propanoyl]oxy}propane-3,1-diyl)oxyethane-2,1-diyl]diacrylate.

11. A polymeric plastic prepared from the polyurethane system of claim 1.

12. The polymeric plastic of claim 11, wherein said polymeric plastic is a layer or a molding.

13. The polymeric plastic of claim 11, wherein said polymeric plastic has a glass transition temperature of less than −40° C.

14. A holographic media prepared from the polyurethane system of claim 1.

15. A holographic media comprising at least one polymeric plastic of claim 11.

16. A polyurethane system comprising
   A) one or more polyisocyanates,
   B) one or more isocyanate-reactive block copolymers,
   C) one or more compounds selected from the group consisting of $\alpha,\beta$-unsaturated carboxylic acid derivatives, vinyl ethers, propylene ether, allyl ether, compounds containing cyclopentadienyl units, olefinically unsaturated compounds, epoxy acrylates and vinyl aromatics, D) optionally one or more free radical stabilizers, and E) one or more photoinitiators wherein said one or more isocyanate-reactive block copolymers comprise linear poly (ε-caprolactone)-block-poly(tetrahydrofuran)-block-poly(ε-caprolactone)polyols having terminal hydroxyl groups and a number average molar mass of from 500 g/mol to 5000 g/mol, wherein the average mass fraction of the poly(tetrahydrofuran) block, based on the number average block copolymer, is in the range of from 0.2 to 0.9 and the average mass fraction of the two poly(ε-caprolactone) blocks, based on the number average block copolymer, is in the range of from 0.1 to 0.8.

17. A polymeric plastic prepared from the polyurethane system of claim 16.

18. The polymeric plastic of claim 17, wherein said polymeric plastic is a layer or a molding.

19. A holographic media prepared from the polyurethane system of claim 16.

20. A holographic media comprising at least one polymeric plastic of claim 17.

* * * * *